United States Patent Office 2,741,896
Patented Apr. 17, 1956

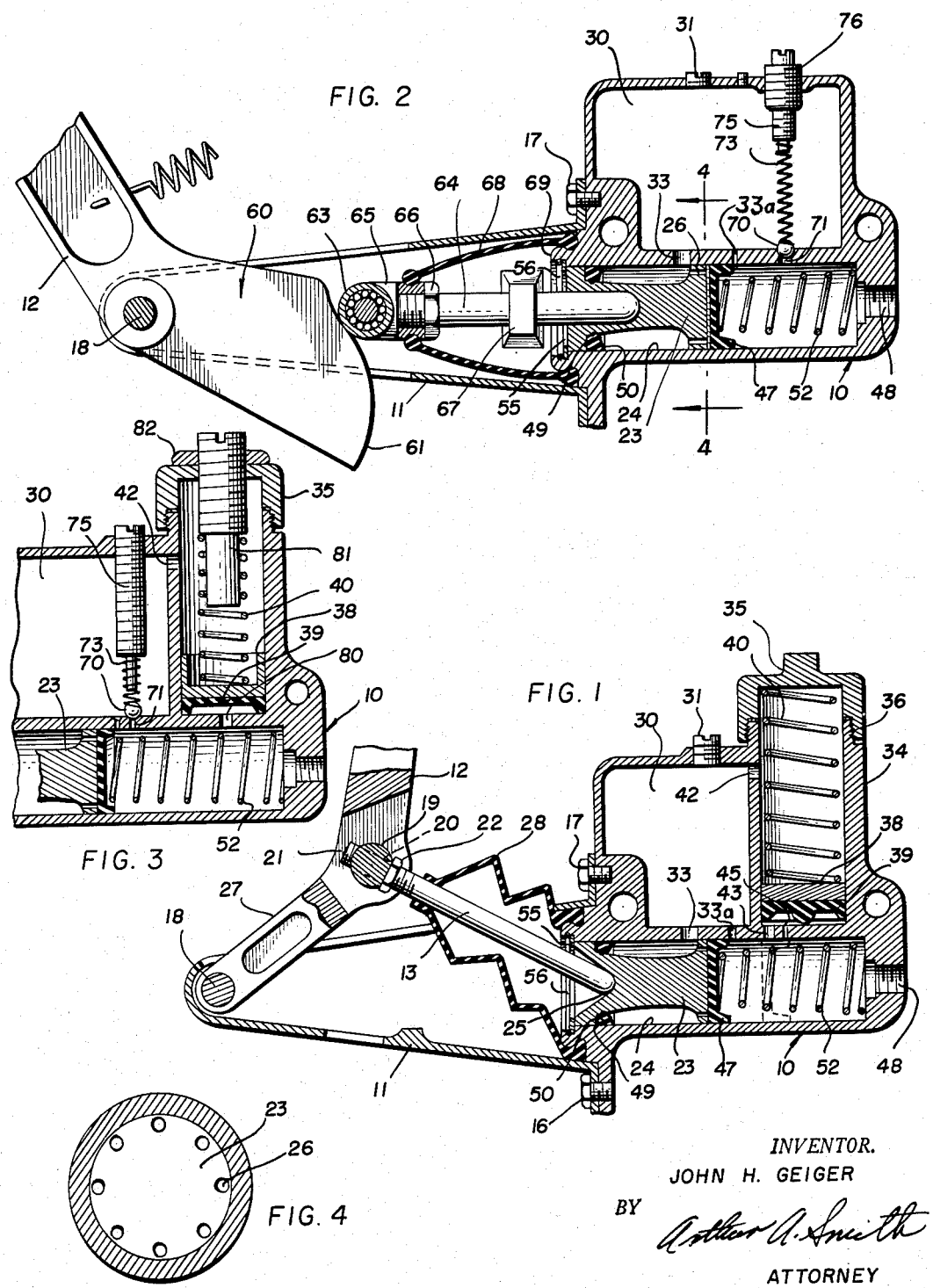

2,741,896

APPARATUS FOR HYDRAULIC BRAKE SYSTEMS

John H. Geiger, Kimmell, Ind.

Application May 22, 1951, Serial No. 227,650

17 Claims. (Cl. 60—54.6)

This invention relates generally to hydraulic brake systems and more particularly to a master cylinder and a mechanism for operating it.

According to conventional practice, passenger automobiles and light or medium trucks are equipped with mechanical or hydraulic brake systems. Heavy trucks are equipped with air operated brake systems, but such systems are not economically feasible for use in small or medium sized trucks. Mechanical brake systems have been found to be generally inadequate in medium sized trucks, principally because it is difficult and sometimes impossible for the truck driver to apply sufficient pressure to the brake pedal to obtain the braking power which is necessary to meet emergency conditions. Hydraulic brake systems which include the conventional type of master cylinder are also inadequate in medium trucks for the same reason. In the prior art hydraulic systems, special master cylinders, comprising compound cylinder arrangements, have been devised for increasing the effective braking pressure as applied by the truck operator. Such systems, however, are subject to the objection that they are exceedingly costly and, because of complex structure, subject to certain faults such as leakage and other types of failure which necessitate frequent repair and expense.

Accordingly, it is the principal object of this invention to provide a novel master cylinder and foot pedal operating linkage for hydraulic brake systems.

Another object of this invention is to provide a novel master cylinder for hydraulic brake systems.

Still another object of this invention is to provide a novel brake pedal and connecting linkage for operating the master cylinder of a hydraulic brake system.

A still further object of this invention is to provide a brake pedal and connecting linkage for operating a hydraulic cylinder having a mechanical advantage for multiplying the operating pressure applied by the truck driver.

Still another object of this invention is to provide a master cylinder for hydraulic brake systems which is adapted to co-operate with a mechanical linkage of the nature of a toggle joint or other linkages having high mechanical advantage.

In accordance with this invention there is provided a mechanical brake operating linkage of the type which provides a certain mechanical advantage and has a limited effective operating motion together with a hydraulic master cylinder which is adapted to take up the slack in the brakes regardless of the degree of wear of the brake shoes and said limited motion.

For a better understanding of the invention, together with other and further objects thereof, reference is made to the following description, taken in connection with the accompanying drawing, and its scope will be pointed out in the appended claims.

In the accompanying drawing:

Figure 1 of the drawing illustrates in cross section a preferred embodiment of this invention.

Figure 2 of the drawing illustrates partially in cross section a second modification of this invention.

Figure 3 of the drawing illustrates a third modification of this invention.

Figure 4 of the drawing is a cross section taken on line 4—4 of Figure 2.

In accordance with this invention, there is provided a master cylinder and brake pedal operating mechanism comprising the master cylinder 10 (Figure 1), a bracket 11, a foot pedal operated lever 12, and an operating arm 13. Bracket 11 may be fixed to the master cylinder 10 by means of bolts 16 and 17, which screw into the master cylinder casting as illustrated in Figure 1 of the drawing. The foot pedal lever 12 may be pivoted at its lower end of the bracket 11 by means of a suitable bolt 18 anchored to the outer end of the bracket. Bolt 18 is intended to provide a pivot point lying on an extension of the longitudinal axis of the master cylinder. The operating arm 13 may be pivotally mounted on the lever 12 by means of a bolt 19, mounted for rotational movement in lever 12 in conventional fashion. Bolt 19 may be provided with a threaded bore 20 for adjustably receiving the threaded outer end 21 of arm 13 and may be locked to bolt 19 by means of lock nut 22. The operating arm may be arranged at its inner end to engage the piston 23 which is slidably mounted within cylinder 24 of master cylinder 10. The piston 23 is provided with a conically recessed end for receiving the rounded end 25 of arm 13. Thus, the portion 27 of lever 12 together with operating arm 13 forms a toggle joint linkage between the pedal lever 12 and the piston 23 which is movable into alignment with the longitudinal axis of master cylinder 10. Lever arm 13 is provided with a boot 28 which is conventionally mounted over the end of cylinder 10 so that dirt and other debris may be prevented from entering the cylinder.

The master cylinder 10 comprises a casting which is formed to provide a reservoir 30 having a filler plug 31. Reservoir 30 may be connected with the master cylinder 24 by means of a breather port 33, which permits flow of brake fluid between the reservoir and the cylinder 24 as the piston 23 moves forward and back, and a replenishing port 33a which connects the reservoir with the cylinder 24 when piston 23 is fully retracted.

The master cylinder casting is also provided with a compensating cylinder 34, the purpose of which will be described subsequently. This cylinder includes a cap 35 which is threaded at 36 to the master cylinder casting. Within the cylinder 34 there is provided a piston 38 and a cup leather 39, both of which are normally maintained in the position shown in Figure 1 by means of a spring 40. The compensating cylinder is provided with a port 42, which permits the flow of brake fluid between reservoir 30 and cylinder 34 whenever the piston 38 is moved upwardly or downwardly. There is also provided a port 43 and a port 45, both of which communicate with the cylinder 24 to permit the flow of brake fluid to and from cylinders 24 and 34.

Piston 23 is provided with a first cup leather 47 for sealing the piston with respect to the cylinder so that forward movement of the piston creates pressure within the cylinder which may be transmitted to an automotive hydraulic brake system (not shown) through the opening 48. The rear end of piston 23 includes a head portion 49 to which is fitted a cup leather or washer 50, which seals the rear end of the piston with respect to the cylinder to prevent the escape of brake fluid from cylinder 24. For returning the piston 23 and the brake lever 12 to the normal inoperative position there is provided a spring 52, which rests between the outer end of cylinder 24 and the cup leather 47. Piston 23 is prevented from being withdrawn or ejected from cylinder 24 by means of a washer 55, which may be retained in position by an expansion ring 56 resting within an annular slot in accordance with conventional practice.

From the foregoing description it will be apparent that the forward movement of piston 23 is limited because of the fact that it reaches its outermost forward position when portion 27 of lever 12 and arm 13 are in alignment with one another. Therefore, unless special provisions are made, the maximum forward movement of piston 23 will not move the brake shoes into contact with the brake drums after the brake shoes become worn to a certain degree. To the end that the brake shoes may be moved into contact with the brake drums in spite of wear, the master cylinder of this invention is designed to apply a limited pressure to the brake system during initial movement of the lever 12 and until portion 27 of lever 12 is moved to within approximately 15 degrees of alignment with the longitudinal axis of master cylinder 10. Ports 43 and 45 control flow of fluid during this initial movement and are situated so that cup leather 47 will not cover them until portion 27 is in the 15 degree position. Port 43 may be of larger diameter than port 45 whereby the rate of flow of fluid into cylinder 34 is decreased when port 43 is closed by cup leather 47. This provides a cushion-like effect on the motion of the brake pedal. The piston 38 and spring 40 co-operate with ports 43 and 45 to further control the pressure in cylinder 24 since spring 40 is designed, in effect, to create a back pressure in cylinder 24 sufficient to insure that the brake shoes will have contacted the drums when cup leather 47 finally covers port 45.

The modification of this invention which has been described in Figure 1 of the drawings operates as follows. When the brake lever 12 is depressed, its initial movement does not multiply except to a limited extent the pressure which is impressed by the operator's foot on the brake pedal, but as the lever travels to the right, the mechanical advantage of arm 27 and the operating arm 13 increases as the angle increases between arm 13 and the portion 27 of the lever 12. Piston 23 moves forward under pressure of arm 13 and brake fluid flows through opening 48 into the brake system for initially taking up the slack between the brake shoes and the brake drums. The initial movement of piston 23 creates a relatively large flow of oil at a relatively low pressure by reason of the fact that brake fluid is permitted to flow through the auxiliary port 43 and the compensating cylinder port 45 until arm 27 reaches its 15 degree position as explained previously. During this initial movement of piston 23, only enough pressure is created to pick up the slack in the brake shoes, after which the pressure necessarily increases within the master cylinder sufficiently to overcome the pressure exerted by spring 40, whereby piston 38 and cup leather 39 move upwardly. At this point oil is permitted to flow through the port 42 into the reservoir 30 whereby only limited back pressure is created within the cylinder 34. Piston 23 eventually closes the port 43 at which time flow of brake fluid is restricted to the port 45 so that there is a marked decrease in rate of flow and a corresponding increase in pressure within the master cylinder. Thus, the pressure increases on the brake shoes to initiate effective application of the brakes. Piston 23 continues to move forward until port 45 is closed, at which time the pressure within the master cylinder and within the brake system increases at a very high rate. At this time the arm 13 and the arm 27 are at a relatively large angle to one another whereby the mechanical advantage of the toggle joint becomes very great so that pressure on the foot pedal is multiplied as much as twenty-five times. This multiplied pressure is applied to the brakes by reason of the fact that the piston has progressed beyond port 45 to the point where full pressure is exerted on the brake system. Thus, the ports 43 and 45 permit a limited flow of oil into the compensating cylinder 34, but at the same time, sufficient pressure is created to take up the slack in the brakes at some time during the initial movement of the brake pedal and regardless of the amount of wear on the brake shoes. Then, at the time that the mechanical linkage consisting of arms 13 and 27 is at a position where the mechanical advantage is approaching a maximum, the brake shoes are always applied to the brake drums despite varying degrees of wear.

A different modification of the invention is disclosed in Figure 2 and like reference characters are utilized for designating parts corresponding to those of Figure 1. Instead of the toggle joint between the brake pedal and the piston of the master cylinder there is provided a cam 60 having a cam surface of such curvature that increased mechanical advantage is obtained when the brake pedal approaches the limit of its operational movement. A cam follower 63 co-operates with the cam surface 61 and is mounted on the end of an operating arm 64 by means of the follower mounting 65. Arm 64 may be threaded into mounting 65 and locked with respect thereto by lock nut 66. For guiding arm 64 there is provided an apertured strut 67 extending between the side walls of bracket 11. For preventing access of foreign matter to master cylinder 10 there is provided a boot 68 which may include an aperture (not shown) for accommodating strut 67 and be conventionally mounted between the end 69 of master cylinder 10 and the mounting member 65.

In this modification of the invention there is provided a poppet valve instead of a compensating cylinder for controlling the flow of brake fluid during the time that the brake shoes are being taken up. The poppet valve consists of a ball 70, seated in a port 71, and maintained in position by means of a spring 73 which is in turn held in position by means of an adjustable screw 75 mounted in a plug 76 threaded to the reservoir. By rotating the screw 75 the tension on spring 73 may be adjusted to, in turn, adjust the pressure which is required to unseat the ball 70. Port 71 corresponds with port 45 of Figure 1 and accomplishes the same purpose.

As in the case of the first modification of this invention, when pressure is initially applied to the foot pedal, the cam 61 moves operating arm 64 and therewith piston 23 forward within the cylinder 24. The pressure increases within the cylinder 24 taking up the slack of the brake shoes as in the modification described in Figure 1. This pressure is determined by the strength and adjustment of spring 73 on the poppet valve 70. This spring should be adjusted to create only sufficient pressure to take up the slack between the brake shoes and the brake drum.

Port 71 is situated so that the cup leather 47 covers the port 71 after approximately 25 degress of movement of cam 60, at which time maximum pressure is created by reason of the fact that the fluid can no longer flow into the reservoir 30 and also by reason of the fact that the lever 12 has moved the cam surface 61 to the point where it provides the maximum mechanical advantage. Thus at the time of maximum mechanical advantage there is maximum pressure in the brake system.

The modification illustrated in Figure 3 of the drawings is similar to that illustrated in Figure 2, except that provisions are made for preventing fracture of the cup leather. This modification may include either of mechanical linkages of Figure 1 or 2. It has been found by experiment that pressure within the cylinder sometimes rises to such a point that, when the cup leather is opposite the equalizing port 71, for example, the pressure is sufficient to fracture the cup leather and allow leakage. Accordingly, in the modification of Figure 3 of the drawings the equalizing port 71 is situated so the cup leather 47 moves beyond equalizing port 71 during the initial and low pressure part of the stroke of the piston. There is provided a compensating cylinder similar in some respects to that shown in Figure 4 of the drawings having a port 80 which is beyond the outer extremity of the stroke of piston 23. The compensating cylinder differs from that shown in Figure 1 in that there is provided a stop 81 which is threaded to the cap 35 and can be adjusted and locked by means of the lock nut 82. During initial forward movement of piston 23 pressure is created as described in connection with Figure 2, and after port 71 is covered and the slack of the brakes is taken up, piston 38 and cup leather 39 move upwardly as the pressure in cylinder 24 increases until such time as piston 38 engages with the stop 81. Oil can no longer flow through port 80 and therefore maximum pressure is applied to the brake shoes. This occurs at the time that the toggle linkage or the cam is providing the maximum mechanical advantage.

From the foregoing description it is apparent that there is provided in accordance with this invention a simple brake operating mechanism having high mechanical advantage with simple and economical structure. It should be further noted that this mechanism always applies the brakes after the same angle of movement of the pedal. Even though this is true, the slack is always taken up in the brake shoes before the pedal reaches its brake application angle of movement.

While this invention has been disclosed as including certain forms of elements which make up the complete assembly, it should be clearly understood that other forms of elements may be substituted by those skilled in the art. For example, there are other forms of mechanical linkages which may provide sufficient mechanical advantage in accordance with the inventive concept. Other forms of pistons, cup leathers, poppet valves and compensating cylinders will also be obvious to those skilled in the art.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. Brake control apparatus for hydraulic brake systems comprising a master cylinder, a piston therein, pedal operating means connected to said piston comprising a pedal lever and a pressure arm connected to said piston to form a knee of a toggle joint whereby movement of said pedal lever moves said lever and arm into a straight line relationship and therewith said piston from a retracted position to a forward position, said master cylinder comprising a compensating cylinder having a compensating port, means for controlling flow in said port and providing a limited, brake operating pressure zone during initial advance of said piston, said piston being movable beyond said port to stop flow of fluid therethrough and to create maximum brake operating pressure.

2. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, a spring biased valve connecting said reservoir and said cylinder for providing a limited, brake operating pressure zone during initial advance of said piston, and a compensating cylinder connected to said master cylinder beyond the most forward position of said piston and comprising a chamber of limited capacity for permitting limited displacement of fluid from said master cylinder thereby to create maximum brake operating pressure after said chamber is filled.

3. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, a valve between said reservoir and said cylinder for providing a limited, brake operating pressure zone during advance of said piston, and a compensating cylinder connected to said master cylinder beyond the most forward position of said piston and comprising a piston in said compensating cylinder, for creating greater brake operating pressure, and an adjustable means in the path of said compensating cylinder piston for limiting the movement thereof to create maximum brake operating pressure.

4. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, a replenishing port connecting said cylinder and said reservoir slightly in advance of the retracted position of said piston, a spring biased valve in advance of said replenishing port for providing a limited, brake operating pressure zone during advance of said piston beyond said replenishing port, and a compensating cylinder connected to said master cylinder beyond the most forward position of said piston and comprising a piston in said compensating cylinder, a compensating cylinder port for connecting said master cylinder and said compensating cylinder for creating greater brake operating pressure, and an adjustable stop in the path of said compensating cylinder piston for limiting the movement thereof to create maximum brake operating pressure.

5. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, a replenishing port connecting said cylinder and said reservoir slightly in advance of the retracted position of said piston, an equalizing port in advance of said replenishing port, a spring biased valve for controlling flow in said equalizing port and providing a limited, brake operating pressure zone during advance of said piston between said replenishing and equalizing ports, and a compensating cylinder connected to said master cylinder beyond the most forward position of said piston and comprising a spring biased piston in said compensating cylinder, a compensating cylinder port for connecting said master cylinder and said compensating cylinder for creating greater brake operating pressure and an adjustable stop in the path of said spring biased piston for limiting the movement thereof to create maximum brake operating pressure.

6. Brake control apparatus for hydraulic brake systems comprising a master cylinder, a piston therein, pedal operating means connected to said piston comprising a mechanical linkage having a mechanical advantage which increases from a minimum in a retracted position to a maximum at an advanced position, said master cylinder comprising a reservoir, and means for controlling flow of fluid from said cylinder to said reservoir and providing a limited, brake operating pressure zone and a maximum brake operating pressure zone during advance of said piston.

7. Brake control apparatus for hydraulic brake systems comprising a master cylinder, a piston therein, pedal operating means connected to said piston comprising a mechanical linkage having a mechanical advantage and a limited stroke at the end of which maximum mechanical advantage occurs, said master cylinder comprising a reservoir, an equalizing port connecting said cylinder and said reservoir in advance of the retracted position of said piston, and means for controlling flow in said port and providing a limited, brake operating pressure zone during advance of said piston between the retracted position of said piston and equalizing port.

8. Brake control apparatus for hydraulic brake systems comprising a master cylinder, a piston therein, pedal operating means connected to said piston comprising a pedal lever and a pressure arm connected to form a knee of a toggle joint whereby movement of said pedal lever moves said lever and arm into a straight line relationship and therewith said piston from a retracted position to a forward position, said master cylinder comprising a reservoir, an equalizing port connecting said cylinder and said reservoir in advance of the retracted position of said piston, and means for controlling flow in said port and providing a limited, brake operating pressure zone during advance of said piston between the retracted position of said piston and said equalizing port.

9. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, an equalizing port connecting said cylinder and said reservoir in advance of the retracted position of said piston, and a valve for controlling flow in said port and providing a limited, brake operating pressure zone during advance of said piston between the retracted position of said piston and said equalizing port.

10. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder comprising a reservoir, a replenishing port connecting said cylinder and said reservoir slightly in advance of the retracted position of said piston, an equalizing port in advance of said replenishing port, and a spring biased valve for controlling flow in said port and providing a limited, brake operating pressure zone during advance of said piston between said compensating and equalizing ports.

11. Brake control apparatus for hydraulic brake systems comprising a master cylinder, a piston therein, pedal operating means connected to said piston comprising a linkage having a mechanical advantage which increases from a minimum in a retracted position to a maximum at an advanced position, said master cylinder comprising a reservoir, and a compensating cylinder connected to said master cylinder adjacent the most forward position of said piston for providing a limited, brake operating pressure zone during advance of said piston between said compensating cylinder and said retracted position.

12. Brake control apparatus for hydraulic brake systems comprising a master cylinder, a piston therein, pedal operating means connected to said piston comprising a toggle joint whereby movement of said pedal lever moves said lever and arm into a straight line relationship and therewith said piston from a retracted position to a forward position, said master cylinder having a compensating cylinder connected thereto adjacent the most forward position of said piston for providing a limited, brake operating pressure zone during advance of said piston between said compensating cylinder and said retracted position.

13. Brake control apparatus for hydraulic brake systems comprising a master cylinder, a piston therein, pedal operating means connected to said piston comprising a pedal lever pivoted at one end thereof and a pressure arm connected between said lever and said piston at an obtuse angle to said lever to form a knee of a toggle joint whereby movement of said pedal lever moves said lever and arm into a straight line relationship and therewith said piston from a retracted position to a forward position, said master cylinder having a compensating cylinder connected thereto adjacent the most forward position of said piston for providing a limited, brake operating pressure zone during advance of said piston between said compensating cylinder and said retracted position and comprising a spring biased piston in said compensating cylinder, and a compensating cylinder port for connecting said master cylinder and said compensating cylinder for creating limited brake operating pressure.

14. Brake control apparatus for hydraulic brake systems comprising a master cylinder, a piston therein, pedal operated means connected to said piston to provide increased mechanical advantage with increased angular movement of said pedal means and means adjacent the most forward position of said piston for providing a limited, brake operating pressure zone during initial advance of said piston and thereafter for providing a higher brake operating pressure zone located forwardly of the limited pressure zone.

15. Brake control apparatus for hydraulic brake systems comprising a master cylinder, a piston therein, pedal operating means connected to said piston comprising a cam mechanism connected to said piston, said cam having a surface designed to provide increased mechanical advantage with increased angular movement, and means for providing a limited, brake operating pressure zone during initial advance of said piston and thereafter for providing a higher brake operating pressure zone located forwardly of the limited pressure zone.

16. Brake control apparatus for hydraulic brake systems comprising a master cylinder, a piston therein, pedal operating means connected to said piston comprising a linkage designed to provide increased mechanical advantage with increased angular movement thereof, and means associated with said cylinder for providing a limited, brake operating pressure zone during initial advance of said piston and thereafter for providing a higher brake operating pressure zone located forwardly of the limited pressure zone.

17. Brake control apparatus for hydraulic brake systems comprising a master cylinder, a piston therein, pedal operating means connected to said piston comprising a pedal lever and a pressure arm connected to said piston to form a knee of a toggle joint whereby movement of said pedal lever moves said lever and arm into a straight line relationship and therewith said piston from a retracted position to a forward position, said master cylinder having a reservoir in combination therewith which contains fluid under atmospheric pressure, means operative to sever said communication upon first protractile movement of said piston, equalizing means effective after the aforesaid first piston movement for providing a limited, brake operating pressure zone during subsequent piston advancement, and means for disabling said equalizing means upon further advance piston movement whereby maximum brake operating pressure is created near the limit of the piston's protractile stroke.

References Cited in the file of this patent

UNITED STATES PATENTS

| | | |
|---|---|---|
| 1,457,156 | Frock | May 29, 1923 |
| 1,562,823 | Dodge | Nov. 24, 1925 |
| 1,644,378 | Hirschler | Oct. 4, 1927 |
| 1,652,232 | Blasdel | Dec. 13, 1927 |
| 2,058,063 | Cox | Oct. 20, 1936 |
| 2,092,251 | Heidloff | Sept. 7, 1937 |
| 2,109,114 | Kerr | Feb. 22, 1938 |
| 2,156,415 | Weihe | May 2, 1939 |
| 2,168,719 | Staude | Aug. 8, 1939 |
| 2,330,047 | Godsey, Jr. | Sept. 21, 1943 |
| 2,438,649 | Roy | Mar. 30, 1948 |
| 2,518,821 | Roy | Aug. 15, 1950 |

FOREIGN PATENTS

| | | |
|---|---|---|
| 782,865 | France | Mar. 25, 1935 |
| 495,751 | Great Britain | Nov. 18, 1938 |
| 309,143 | Italy | June 27, 1933 |